Patented Jan. 7, 1941

2,227,508

UNITED STATES PATENT OFFICE 2,227,508

PREPARATION OF TITANIUM GLUCONATE

Walter K. Nelson, Metuchen, N. J., assignor to National Lead Company, New York, N. Y., a corporation of New Jersey No Drawing. Application July 21, 1937,
Serial No. 154,779

8 Claims. (Cl. 260—429)

The object of my invention is a novel method for the preparation of a metallic-organic compound of titanium and gluconic acid.

I have found that when an alkaline earth metal gluconate, for example, calcium gluconate, barium gluconate or strontium gluconate is added to sulfuric acid solution of titanium there is formed a precipitate of alkaline earth metal sulfate and there remains in solution a soluble compound of titanium and gluconic acid.

According to my invention the alkaline earth metal gluconate is first reacted with the sulfuric acid solution of titanium. Upon the completion of the reaction the sulfate of the alkaline earth metal is found as a precipitate with a more or less viscous mass, depending upon the concentration of the solution employed, which comprises the titanium gluconate. Upon diluting with water, if this should be necessary, and separating the alkaline earth metal sulfate, for example, by filtration, there is obtained a solution of the titanium gluconate. The solid compound of titanium and gluconic acid may be extracted from this solution preferably by the addition of a precipitating agent, for example, an organic liquid miscible with water in which, however, the titanium gluconate is insoluble. The precipitate so obtained will consist of a substantially pure titanium gluconate. The organic liquid may, of course, be recovered by well established means in the art, for example, by distillation. Evaporation of the titanium gluconate solution to dryness may also be resorted to in order to obtain the dry compound. Of course, the titanium gluconate solution may be used as such with or without concentration.

I have found that the relative purity of the titanium gluconate depends in a large measure upon the relative proportions of titanium dioxide and sulfuric acid present in the titanium sulfate solution employed. In general, in this solution the ratio of titanium dioxide to sulfuric acid should be as nearly as possible in the relation of one molecule of titanium dioxide to one molecule of sulfuric acid. Such a solution in which there is present one molecule of sulfuric acid to every molecule of titanium dioxide is sometimes referred to as a solution of titanyl sulfate and the formula of the titanyl sulfate is given as $TiOSO_4$. When such a solution is employed the product will consist substantially of titanium gluconate. However, as the ratio of sulfuric acid to titanium dioxide increases there is formed, together with the titanium gluconate, uncombined gluconic acid. The greater the excess of sulfuric acid over the monomolecular ratio the larger will be the content of uncombined gluconic acid in the final product.

Thus, for example, I have obtained products containing only between 22.5 and 25.5 percent of combined titanium calculated as dioxide when employing a solution containing 1.18 mols. $H_2SO_2$ for every mol. $TiO_2$. On the other hand, when using a solution containing equimolecular proportions of $H_2SO_4$ and $TiO_2$ I have obtained products containing from 28.5 to 30.5 percent of combined titanium calculated as dioxide.

My novel compound is thus seen to be a basic titanium gluconate containing approximately 29 percent of combined titanium calculated as dioxide, or 17.5 percent of combined titanium.

An excess of titanium calculated as dioxide over the one-to-one ratio, i. e. 1 mol. $H_2SO_4$ to 1 mol. $TiO_2$, may result in contamination by uncombined hydrous titanium oxides.

The alkaline earth metal gluconate may be prepared in the well-known manner, for example, by adding an alkaline earth metal hydroxide or carbonate to an aqueous solution of d-gluconic acid. Calcium gluconate is a standard article of commerce and may be employed in the practice of my invention in the form in which it is available.

The sulfuric acid solution of titanium may be prepared in the well-known manner, for example, by dissolving orthotitanic acid in sulfuric acid while adjusting the quantities in order to obtain a solution of the preferred ratio of titanium dioxide to sulfuric acid.

A preferred method of operating my invention is to slowly add powdered calcium gluconate— $Ca(OOC.C_5H_6(OH)_5)_2$ to the titanyl sulfate solution which is being agitated during the addition. A reaction occurs at once with the precipitation of calcium sulfate and the formation of a greenish-yellow viscous mass, the viscosity of which increases during the course of the reaction. In order to preserve the fluidity of the reaction mass water may be added together with the calcium gluconate or at the end of the reaction. After the precipitated calcium sulfate has settled, the supernatant liquor containing the titanium gluconate is separated by decantation or filtration. The titanium gluconate then may be precipitated from the solution by the addition of a non-solvent liquid, for example, methyl alcohol. The titanium gluconate is precipitated from solution as a white precipitate which may be washed and dried. By the exercise of proper care it is possible to obtain high yields, for example, up to 90 percent of the titanium in the form of titanium gluconate.

I prefer to employ methyl alcohol as a precipitating agent but other organic liquids such as ethyl alcohol, isopropyl alcohol, acetone, etc., which are miscible with water but in which the the titanium gluconate is insoluble, may also be employed.

Thus, having described my invention the following example is given for the purposes of illustration, from which, however, no undue limitations are to be construed:

Example

To 1157 grams of a titanyl sulfate solution containing 206 grams of titanium calculated as dioxide and 255 grams of sulfuric acid

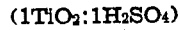

was slowly added with stirring 1244 grams of powdered calcium gluconate,

in 100 gram portions. Reaction occurred immediately with the precipitation of calcium sulfate and the formation of a greenish-yellow paste which became very viscous during the course of the reaction. Small quantities of water were added at frequent intervals to maintain a fluid mass, the total amount of water added being 500 cc.

The mixture was allowed to stand over night and was then filtered with the aid of suction, after which the gelatinous residue was repulped with 600 cc. of fresh water, filtered and the two filtrates combined. The yield was 2790 grams of a clear greenish-yellow solution containing 196 grams of titanium dioxide (soluble), as titanium gluconate, which represented a 95 percent recovery of the total titanium used.

To 500 cc. of the above titanium gluconate solution, containing 35.1 grams of titanium dioxide (soluble), was slowly added with rapid stirring 2500 cc. of methyl alcohol in 500 cc. portions. A white precipitate was immediately formed which redissolved in the water-alcohol mixture at first, but was reprecipitated as the ratio of alcohol to water was increased. The final precipitate was rapidly filtered off with the aid of suction and immediately repulped with 2500 cc. of fresh methyl alcohol and again filtered. The product was dried, first at room temperature and then at 75° C. The yield was 105.6 grams of a fine white powder containing 28.7 percent titanium dioxide (soluble), representing 86.4 percent recovery of the total titanium originally in solution.

The product so obtained represents substantially pure titanium gluconate.

Although it appears that the titanium and gluconic acid is combined as a basic titanium gluconate, it will be understood that I do not intend to limit my invention to such a compound. The percent composition indicates the formation of the basic titanium compound, and the water solubility indicates combination of the titanium.

The foregoing description represents that feature of my invention directed to the preparation of a metallo-organic compound of titanium and gluconic acid. For the preparation of a composition useful in tanning white or light colored leathers the dry titanium gluconate may be employed. On the other hand, the solution of titanium gluconate obtained after separating the alkaline earth sulfate may be thus employed directly. As an alternative in such cases where it is not desired to obtain the relatively pure solid titanium gluconate, a solution of an alkali metal gluconate may be reacted directly with a titanium sulfate solution and the resulting liquid containing the alkali metal sulfate and titanium gluconate may be employed as the tanning solution. Thus, for example, a titanium sulfate solution having a ratio of approximately one mol. $TiO_2$ to one mol. $H_2SO_4$ is reacted with a sodium gluconate solution containing an equivalent amount of sodium gluconate. It will be seen that the tanning solution may thus be prepared by precipitating the relatively pure titanium gluconate or by employing the solution obtained after removing the alkaline earth sulfate or by employing a solution resulting from the double decomposition of an alkali metal gluconate and a titanium sulfate, both in aqueous solution.

I have found that the degree of tanning will depend upon the pH of the titanium gluconate solution. Beginning at a pH value of 1.0 the absorption or fixation of titanium by the leather increases up to pH values between 4.0 and 4.5 and then decreases as the pH value approaches neutrality. The preferred pH range lies between 4.0 and 4.75 although it will be understood that some deviation beyond this range is not to be excluded from the scope of my invention.

The foregoing description of my invention has been given for clearness of understanding and no undue limitations are to be deduced therefrom, but the appended claims should be construed as broadly as possible in the light of the prior art. Moreover the expression "alkali-forming metal" as used in the appended claims is meant to include both the alkaline earth metals, i. e., barium, calcium, strontium etc., as well as the alkali metals, i.e., sodium, potassium, lithium etc.

The tanning agent disclosed but not claimed herein is claimed in my co-pending application Serial No. 334,572, filed May 11, 1940.

I claim:

1. A method for the preparation of a metallo-organic compound of titanium which comprises subjecting to double decomposition an alkaline earth metal gluconate and a titanium sulfate solution in which the molecular ratio of titanium dioxide to sulfuric acid is substantially 1:1.

2. A method for the preparation of titanium gluconate which comprises subjecting to double decomposition calcium gluconate and titanyl sulfate.

3. A method for the preparation of a substantially pure metallo-organic compound of titanium which comprises mixing an alkaline earth gluconate with a titanium sulfate solution, said titanium sulfate solution being in the approximate proportion of one molecule of sulfuric acid to one molecule of titanium dioxide, dissolving the metallo-organic compound of titanium in an aqueous medium, separating this solution from the sulfate of the alkaline earth metal, and precipitating the substantially pure metallo-organic compound from the said solution by means of a precipitating agent, washing and drying the same.

4. A method for the preparation of a substantially pure titanium gluconate which comprises mixing calcium gluconate with titanyl sulfate, dissolving the titanium gluconate in water, filtering, precipitating the titanium gluconate from aqueous solution by the addition of methyl alcohol, and washing and drying the same.

5. A method for the preparation of a solution containing titanium gluconate which comprises mixing solutions of sodium gluconate and titanium sulfate, the molecular ratio of titanium dioxide to sulfuric acid in the said titanium sulfate solution being substantially 1:1.

6. As a new product of manufacture, a basic titanium gluconate, in which the molecular ratio of titanium, calculated as $TiO_2$, to gluconic acid is substantially 1:1.

7. A method for the preparation of a metallo-organic compound of titanium which comprises subjecting to double decomposition a compound of an alkali-forming metal gluconate and a titanium sulfate solution in which the molecular ratio of titanium dioxide to sulfuric acid is substantially 1:1.

8. A method for the preparation of a metallo-organic compound of titanium which comprises subjecting to double decomposition an alkali metal gluconate and a titanium sulfate solution in which the molecular ratio of titanium dioxide to sulfuric acid is substantially 1:1.

WALTER K. NELSON.